United States Patent
Mizuno et al.

(10) Patent No.: US 11,056,730 B2
(45) Date of Patent: Jul. 6, 2021

(54) VOLTAGE DETECTION TERMINAL HOLDING STRUCTURE

(71) Applicant: Yazaki Corporation, Tokyo (JP)

(72) Inventors: Takahiro Mizuno, Kakegawa (JP); Yasutaka Miyazaki, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 181 days.

(21) Appl. No.: 16/385,331

(22) Filed: Apr. 16, 2019

(65) Prior Publication Data

US 2019/0252739 A1 Aug. 15, 2019

Related U.S. Application Data

(63) Continuation of application No. PCT/JP2017/041540, filed on Nov. 17, 2017.

(30) Foreign Application Priority Data

Nov. 18, 2016 (JP) .............................. JP2016-225111

(51) Int. Cl.
| | | |
|---|---|---|
| *H01M 10/48* | (2006.01) | |
| *H01M 2/20* | (2006.01) | |
| *H01R 4/02* | (2006.01) | |
| *H01R 9/16* | (2006.01) | |
| *H01R 9/22* | (2006.01) | |
| *H01M 50/20* | (2021.01) | |
| *H01M 50/50* | (2021.01) | |
| *H01M 50/502* | (2021.01) | |
| *H01R 11/11* | (2006.01) | |

(52) U.S. Cl.
CPC ......... *H01M 10/482* (2013.01); *H01M 10/48* (2013.01); *H01M 50/20* (2021.01); *H01M 50/50* (2021.01); *H01M 50/502* (2021.01); *H01R 4/029* (2013.01); *H01R 9/16* (2013.01); *H01R 9/22* (2013.01); *H01M 2220/20* (2013.01); *H01R 11/11* (2013.01); *H01R 2201/20* (2013.01)

(58) Field of Classification Search
CPC ...... H01M 10/482; H01M 2/10; H01M 10/48; H01M 2/20; H01M 2/206; H01M 2220/20; H01R 9/16; H01R 9/22; H01R 4/029; H01R 2201/20; H01R 11/11; Y02E 60/10

See application file for complete search history.

(56) References Cited

U.S. PATENT DOCUMENTS

| | | | |
|---|---|---|---|
| 2011/0008669 A1 | 1/2011 | Ogasawara et al. | |
| 2013/0171495 A1* | 7/2013 | Ogasawara | H01M 2/1077 429/121 |
| 2013/0302663 A1* | 11/2013 | Teramoto | H01M 2/1077 429/160 |
| 2014/0315441 A1* | 10/2014 | Kinoshita | H01M 2/206 439/627 |
| 2015/0086819 A1* | 3/2015 | Ogasawara | H01M 10/48 429/90 |

FOREIGN PATENT DOCUMENTS

| | | |
|---|---|---|
| JP | 2011-18499 A | 1/2011 |
| JP | 2014-49235 A | 3/2014 |
| JP | 2017-98043 A | 6/2017 |
| WO | 2016/047477 A1 | 3/2016 |

OTHER PUBLICATIONS

Written Opinion dated Jan. 9, 2018 issued by the International Searching Authority in counterpart Application No. PCT/JP2017/041540 (PCT/ISA/237).
Search Report dated Jan. 9, 2018, issued by the International Searching Authority in counterpart International Patent Application No. PCT/JP2017/041540 (PCT/ISA/210).
Written Opinion dated Jan. 9, 2018, issued by the International Searching Authority in counterpart International Patent Application No. PCT/JP2017/041540 (PCT/ISA/237).
Office Action dated Feb. 5, 2019, issued by the Japanese Patent Office in counterpart Japanese Patent Application No. 2016-225111.

* cited by examiner

*Primary Examiner* — Muhammad S Siddiquee
(74) *Attorney, Agent, or Firm* — Sughrue Mion, PLLC

(57) ABSTRACT

A voltage detection terminal holding structure includes a bus bar holding part and the voltage detection terminal held in the bus bar holding part. The voltage detection terminal includes an electric connection part configured to be connected to a bus bar, a wire connection part configured to be connected to an electric wire, and a temporary fixing part. The temporary fixing part is formed between the electric connection part and the wire connection part. The temporary fixing part is temporarily fixed to the bus bar holding part in a state that a movement in a axis direction in an end of the electric wire connected to the wire connection part is regulated and in a state that a displacement in a perpendicular direction to the axis direction and a rotation around the axis direction are allowed.

5 Claims, 7 Drawing Sheets

FIG.3
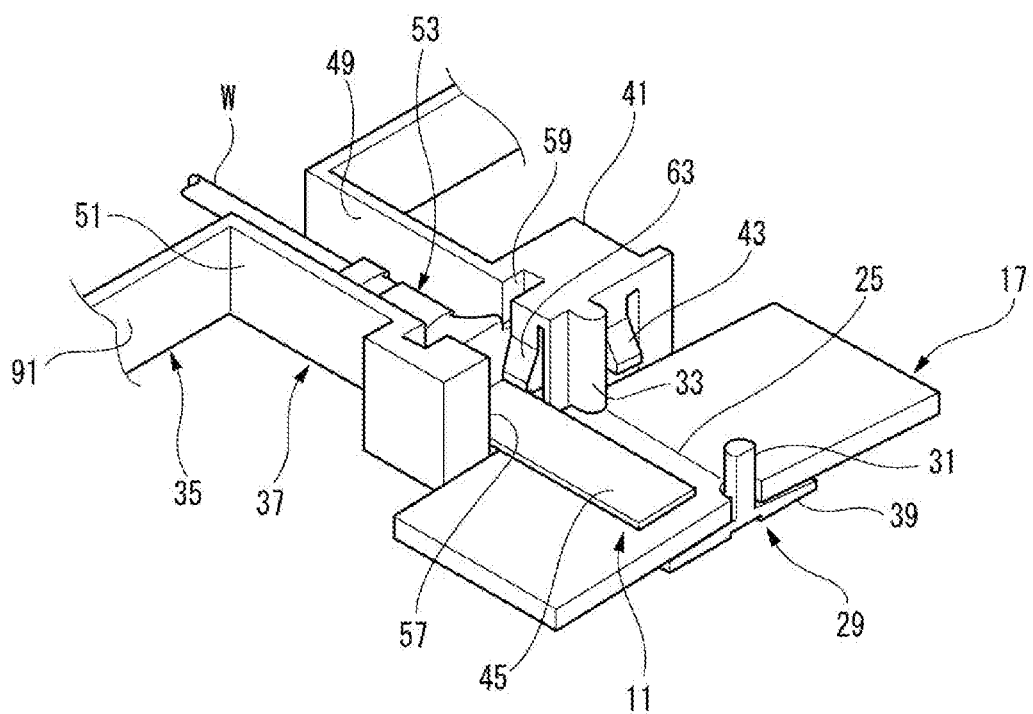
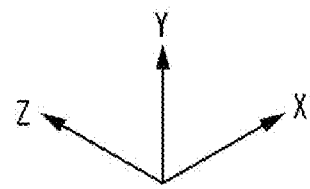

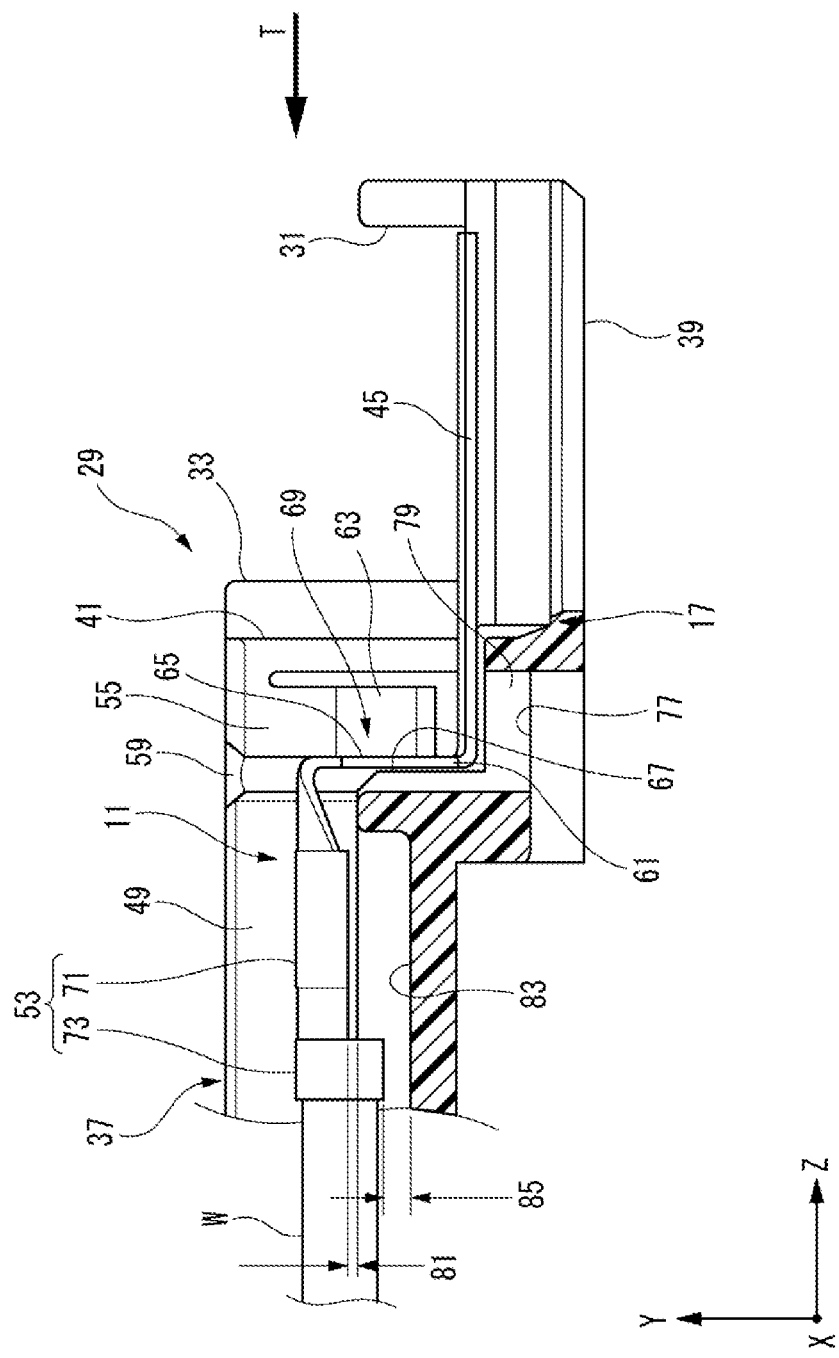

VOLTAGE DETECTION TERMINAL HOLDING STRUCTURE

CROSS REFERENCE TO RELATED APPLICATIONS

This application is a continuation of PCT application No. PCT/JP17/041540, which was filed on Nov. 17, 2017 based on Japanese Patent Application (No. 2016-225111) filed on Nov. 18, 2016, the contents of which are incorporated herein by reference.

BACKGROUND OF THE INVENTION

Field of the Invention

The invention relates to a voltage detection terminal holding structure.

Description of Related Art

In a vehicle battery pack to be connected to a power converter for driving a motor in a vehicle such as a hybrid car and an electric car, the positive electrode terminals and negative electrode terminals of a large number of battery cells are alternately superimposed in opposite directions and are arranged side by side so as to adjoin each other, thereby configuring a battery module. And, by connecting together the electrode terminals of the adjacent battery cells by a connecting member such as a bus bar, the multiple battery cells are connected together in series or in parallel.

When assembling the above configured battery module, the electrode terminals at multiple locations must be connected together by the bus bar. Thus, there is used a bus bar module which stores such number of bus bars stored in a bus bar storage part (bus bar holding part) formed in an insulating resin-made wire routing body as corresponds to the number of electrode terminals to be connected together.

Here, in connecting together multiple battery cells in series or in parallel, when battery characteristics such as a battery voltage are not uniform between the battery cells, there is a possibility that the battery can be deteriorated or broken. Therefore, in the vehicle battery pack, in order to stop charge and discharge before abnormality occurs in the voltage of each battery cell, a voltage detection wire for detecting the voltage of the battery cell is attached to each bus bar.

In a conventional bus bar module, the voltage detection wire employs a structure in which the tip of a coated wire is peeled off, a round terminal is crimped to the thus-exposed core wire (conductor), is engaged with the electrode terminal of the battery cell, and is tightened to the electrode terminal together with the bus bar using a nut (see, for example, the patent document 1 etc.)

As shown in FIG. 7, a related bus bar module 501 comprises a wire routing body 510 which is made of insulating resin and includes multiple bus bar storage parts 503 for storing and fixing multiple bus bars 521 individually. In the wire routing body 510, the bus bar storage parts 503 and a wire routing part 505 are formed integrally.

Each bus bar 521 is configured such that adjacent batteries stored and fixed in the bus bar storage part 503 can be connected together in series. The bus bar 521 has a pair of battery connection holes 523 penetrating therethrough in a circular shape.

The bus bar storage part 503 includes a bottom wall 502 having a rectangular outer shape and a frame-like peripheral wall 504 arranged continuously to the end of the bottom wall 502.

The peripheral wall 504 is arranged and formed according to the outer shape of the bus bar 521. Locking lances 509 are formed respectively in a pair of long side walls of the bus bar which extend in parallel to the longitudinal direction of the bus bar. The paired locking lances 509 are used to store and fix the bus bar 521 stored within the bus bar storage part 503. Also, the outer shape part of the bus bar 521 is received by the bottom wall 502 and is surrounded by the peripheral wall 504 of the bus bar storage part 503, whereby the bus bar 521 is fixed in a state where it is held without rattling.

Further, the bus bar storage part 503 holds a voltage detection terminal 531 for measuring the voltage of a unit battery. The holding structure of the voltage detection terminal 531 has a hole 535 through which an electrode terminal (not shown) can be inserted. The voltage detection terminal holding structure 531 inserts a projection 537 of an electric connection part 533 of the voltage detection terminal 531 into a recess 515 of the peripheral wall 504, and locks the side edges of the electric connection part 533 to locking lances 511 of the peripheral wall 504, thereby fixing the voltage detection terminal 531 temporarily. Also, positioning of the voltage detection terminal 531 is performed by bringing positioning ribs 513 provided on and projected from the peripheral wall 504 into contact with the side edges of the electric connection part 533.

A voltage detection wire W with one end connected to the voltage detection terminal 531 is stored into a wire routing part 505 formed on one edge side of the bus bar storage part 503 along the arrangement direction thereof, while the other end is connected to a voltage detection circuit (not shown). The wire routing part 505 is connected through a connecting part 507 to the respective bus bar storage parts 503.

[Patent Document 1] JP-A-2011-18499

According to a related art, in a voltage detection terminal holding structure, when holding a voltage detection terminal in a bus bar storage part, an assembling property is not good.

Further, each bus bar storage part must have a peripheral wall and thus a wire routing body becomes large in size, thereby raising a tendency that manufacturing cost increases and weight becomes heavy.

SUMMARY

One or more embodiments provide a voltage detection terminal holding structure which, while ensuring the positioning of the voltage detection terminal with respect to a bus bar holding part and the like, can reduce useless parts and can reduce the size and weight of a wire routing body, thereby enabling reduction of manufacturing cost.

The above object of the invention is attained by the following configurations.

(1) A voltage detection terminal holding structure comprising:

a bus bar holding part; and the voltage detection terminal held in the bus bar holding part, wherein the voltage detection terminal includes an electric connection part configured to be connected to a bus bar, a wire connection part configured to be connected to an electric wire, and a temporary fixing part, and wherein the temporary fixing part is formed between the electric connection part and the wire connection part, and wherein the temporary fixing part is temporarily fixed to the bus bar holding part in a state that a movement in an axis direction in an end of the electric wire connected to the wire connection part is regulated and in a state that a displacement in a perpendicular direction to the axis direction and a rotation around the axis direction are allowed.

According to the voltage detection terminal holding structure of the (1) configuration, since the temporary fixing part of the voltage detection terminal is temporarily fixed to the bus bar holding part, there is eliminated the need for provision of a fixing part for temporarily fixing the voltage detection terminal to the peripheral wall surrounding the bus bar. Thus, the peripheral wall of the wire routing body can be omitted, thereby enabling downsizing of the wire routing body.

Also, in the voltage detection terminal, since it is not necessary to temporarily fix the side edge of the electric connection part to the peripheral wall, the electric connection part can be formed in the minimum size necessary for electric connection with the bus bar, thereby enabling downsizing.

Further, in the voltage detection terminal, while the movement of the temporary fixing part in a direction along the axis in the end of the voltage detection wire is regulated, the displacement thereof in a direction perpendicular to the axis and the rotation thereof around the axis are allowed. While the temporary fixing part is surely positioned with respect to the bus bar in a direction where the electric connection part extends in a direction along the axis, the temporary fixing part is allowed to follow the displacement of the bus bar in a direction perpendicular to the axis and the rotation of the bus bar around the axis. Thus, the voltage detection terminal can absorb the displacement of the bus bar and thus can always maintain the electric connection part in a good contact state with respect to the bus bar.

(2) The voltage detection terminal holding structure according to the above-described (1), wherein the temporary fixing part includes a terminal projection piece configured to be inserted into a groove of the bus bar holding part so as to regulate the movement in the axis direction, and wherein the bus bar holding part includes a terminal holding part regulating a movement of the electric connection part in an anti-insertion direction with respect to the groove at a position separated from the electric connection part.

According to the voltage detection terminal holding structure of the (2) configuration, by inserting the terminal projection piece of the temporary fixing part of the voltage detection terminal into the groove of the bus bar holding part, the temporary fixing position of the voltage detection terminal in a direction along the axis in the end of the voltage detection wire can be positioned accurately.

Also, in the voltage detection terminal, the direction to insert the terminal projection piece into the groove of the bus bar holding part is the same direction as the direction in which the terminal projection piece is engaged with the terminal holding portion of the bus bar holding part, thereby enabling enhancement in assembling workability and thus reduction of manufacturing cost. The terminal holding portion regulates, at a position separated from the electric connection part, the movement of the electric connection part in an anti-insertion direction with respect to the groove, while the terminal holding portion will not interfere with the temporary fixing part which follows the displacement of the bus bar in a direction perpendicular to the axis and the rotation of the bus bar around the axis.

(3) The voltage detection terminal holding structure according to the above-described (2), wherein the temporary fixing part includes a rising wall having a crank-shaped section, which abuts with the bus bar holding part so as to regulate a movement of the voltage detection terminal in a pull direction of the electric wire, and wherein the terminal projection piece projects from a side edge of the rising wall.

According to the voltage detection terminal holding structure of the (3) configuration, the rising wall and terminal projection piece formed on the temporary fixing part of the voltage detection terminal provide surfaces perpendicular to the axis in the end of the voltage detection wire and are contacted with the bus bar holding part. Thus, the temporary fixing part is supported by the bus bar holding part with a large area, thereby enabling the voltage detection terminal to secure a great strength in the wire pulling direction. Also, in the case of the movement of the voltage detection terminal in the direction opposite to the wire pulling direction as well, the terminal projection piece is surface contacted with the groove. Thus, when compared with a configuration in which the end edge of the terminal projection piece is contacted with the bus bar holding part, the movement regulation strength in the same direction can be increased.

According to a voltage detection terminal holding structure of the invention, while ensuring the positioning of the voltage detection terminal with respect to the bus bar holding part and the like, useless parts can be reduced and the wire routing body can be reduced in size and weight, thereby enabling reduction of manufacturing cost.

Description has been given heretofore briefly of the invention. Further, when the below-described mode (which is hereinafter called [embodiment]) for carrying out the invention is read through with reference to the accompanying drawings, the details of the invention can be clarified further.

BRIEF DESCRIPTION OF THE DRAWINGS

FIG. 3 is a perspective view of a voltage detection terminal held by the bus bar holding part shown in FIG. 1.

FIG. 5 is a section view taken along the A-A arrow shown in FIG. 4.

FIG. 6A is a view of a voltage detection terminal which maintains a good contact state with respect to the bus bar while oscillating clockwise, FIG. 6B is a view of a voltage detection terminal which is in a good contact state with respect to the bus bar when not in oscillation, and FIG. 6C is a view of a voltage detection terminal which maintains a good contact state with respect to the bus bar while oscillating counterclockwise.

DETAILED DESCRIPTION

Now, description is given of an embodiment according to the invention with reference to the drawings.

Figure 1:
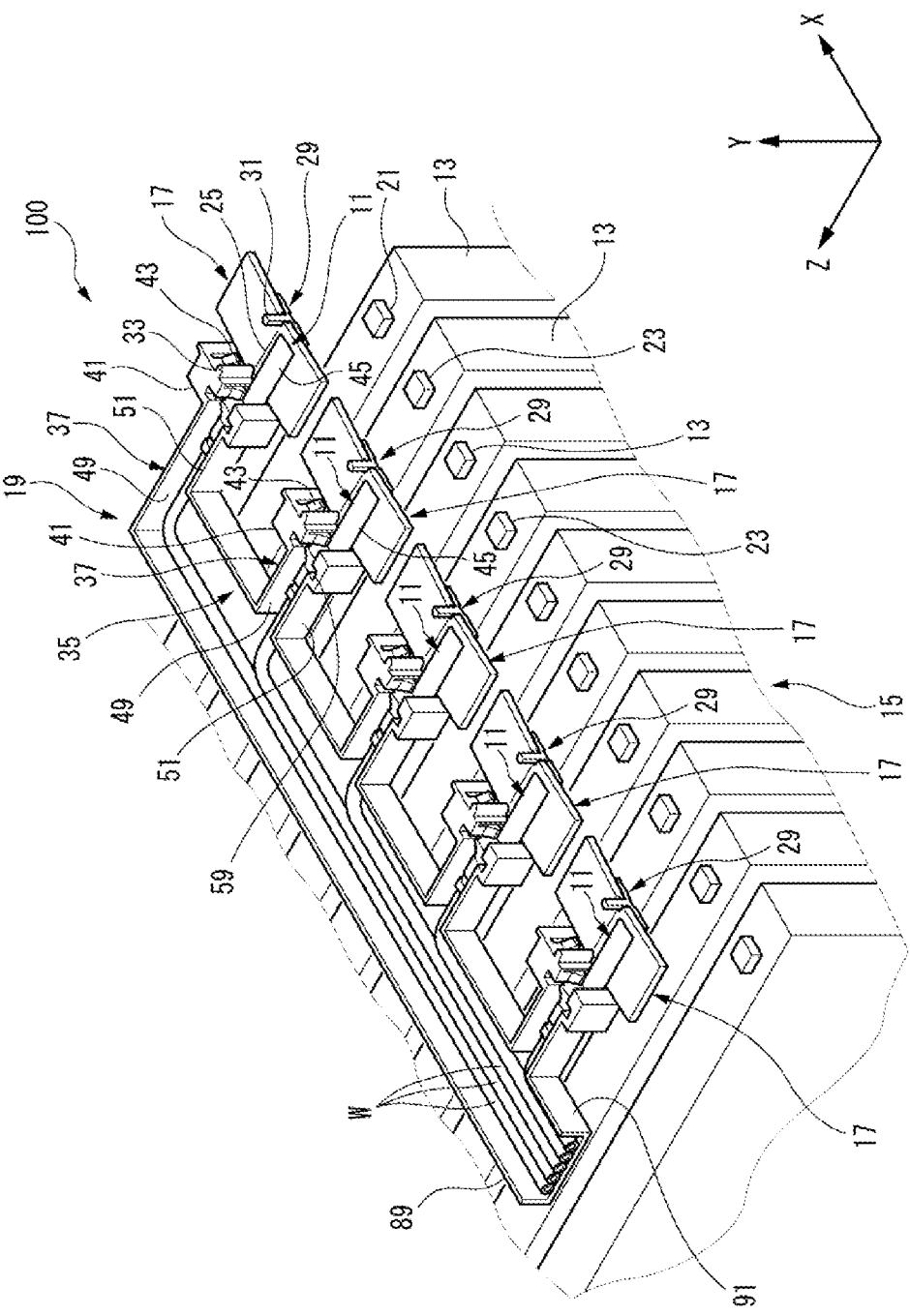
FIG. 1 is a partial perspective view of a bus bar module including a voltage detection terminal holding structure according to an embodiment of the invention, showing a state just before it is mounted onto a battery assembly.

As shown in FIG. 1, a bus bar module 100 including a holding structure of a voltage detection terminal 11 according to the embodiment is mounted on a battery assembly 15 composed of multiple unit batteries 13 and supplies power from the battery assembly 15 to the electric motors of an electric car running using an electric motor, and a hybrid car running using both an engine and an electric motor, etc.

Figure 2:
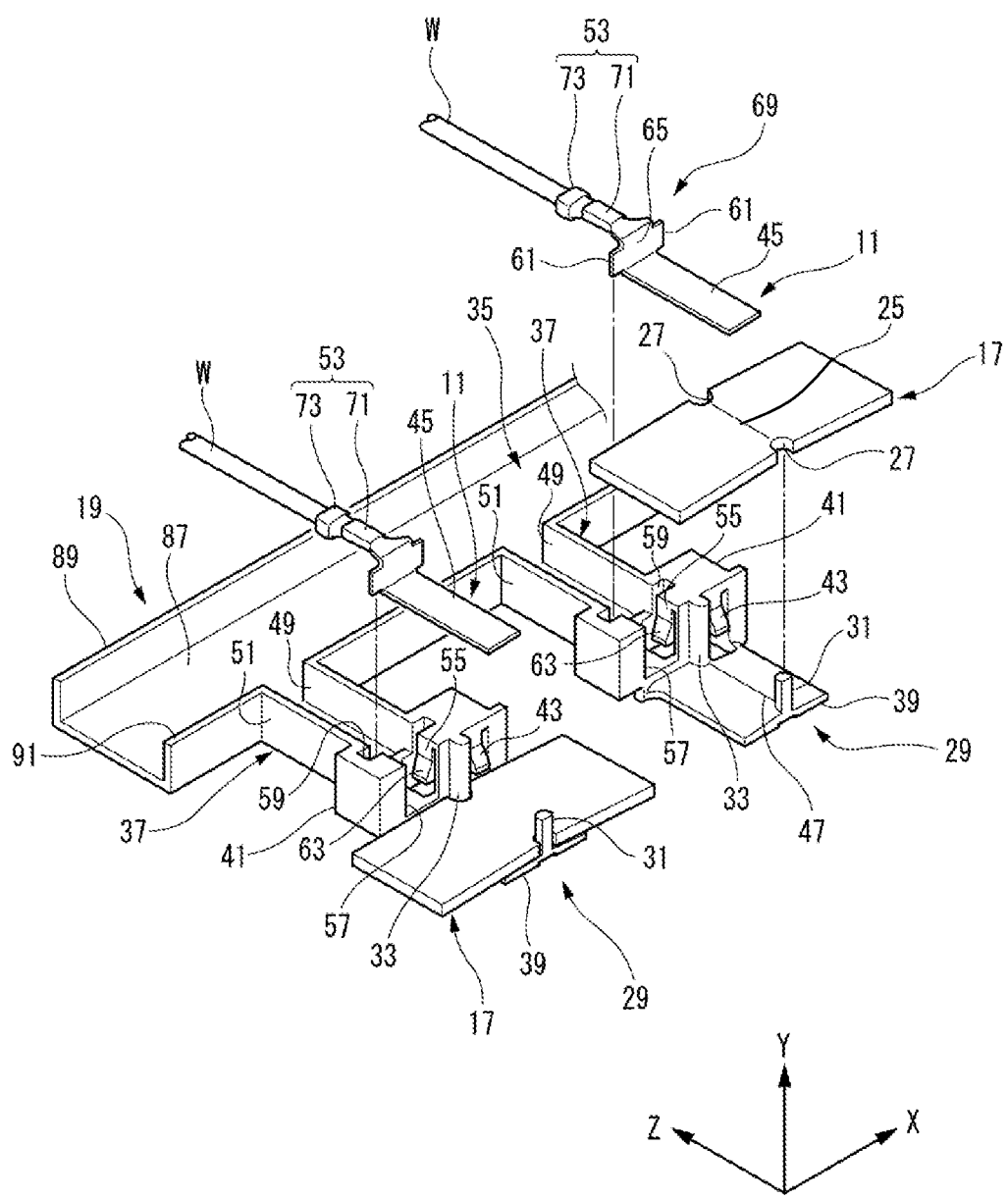
FIG. 2 is an enlarged exploded perspective view of main parts of the bus bar module shown in FIG. 1.

As shown in FIGS. 1 and 2, the bus bar module 100 according to the embodiment of the invention includes multiple bus bars 17 for electrically connecting together the unit batteries 13 of the battery assembly 15, voltage detection wires (electric wires) W to which voltage detection terminals 11 respectively to be welded to the surfaces of the multiple bus bars 17 are connected, and a wire routing body 19 made of insulating resin. Here, in this specification, the directions of the X axis, the Y axis and the Z axis are assumed to follow arrows shown in FIG. 1.

The battery assembly 15 includes multiple unit batteries 13 and members (not shown) for fixing the multiple unit batteries 13 one on top of the other. Each unit battery 13 includes: a rectangular parallelepiped battery main body; and, a pair of plus terminal 21 and minus terminal 23 which are electrode terminals respectively projected from one end and the other end of the upper surface of the battery main body. The plus terminal 21 and minus terminal 23 are made of conductive metal in a shape having a rectangular convex upper surface. In the battery assembly 15, the multiple unit batteries 13 are superimposed alternately in opposite directions such that the plus terminals 21 and minus terminals 23 adjoin each other. In the battery assembly 15, by connecting together the plus terminal 21 and minus terminal 23 using the bus bar 17, there is formed a series connection circuit between the mutually adjoining unit batteries 13, thereby obtaining a high voltage DC voltage.

The bus bar 17 of this embodiment, as shown in FIG. 2, is obtained by pressing a conductive metal plate. The bus bar 17 is formed such that its rectangular plate-shaped central part in the longitudinal direction is mountain folded as a ridgeline 25. The bus bar 17 is arranged while straddling over the adjoining unit batteries 13. In this case, when there is a height difference between the adjoining unit batteries 13, the bus bar 17 oscillates about the ridgeline 25 (see FIGS. 6A-6C). Thus, the bus bar 17 is configured such that, even when the adjoining unit batteries 13 provide a height difference, its two ends in the longitudinal direction are always in contact with the paired plus terminal 21 and minus terminal 23.

Each bus bar 17 includes a pair of engaging parts 27 in its peripheral edges (opposed long side parts). Each engaging part 27 has a semi-circular notch-like shape. The engaging parts 27 are engaged by a first projection 31 and a second projection 33 formed in a bus bar holding part 29 which is described later.

The two ends of the bus bar 17 in the longitudinal direction are respectively welded to the plus terminal 21 and minus terminal 23, whereby the bus bar 17 is electrically connected and fixed to the unit battery 13. Of course, in the bus bar 17 of the invention, when it is fixed in such a manner that nuts (not shown) are screwed to the plus terminal 21 and minus terminal 23 respectively formed in a bolt-like shape, a pair of terminal holes are formed in the bus bar 17.

The wire routing body 19 according to this embodiment includes multiple bus bar holding parts 29 arranged in parallel to each other in the arrangement direction of the multiple unit batteries 13 for holding the bus bars 17, a wire routing part 35 for storing the multiple voltage detection wires W along the superimposing direction of the multiple unit batteries 13, and connecting parts 37 for connecting together the bus bar holding parts 29 and wire routing part 35. The wire routing body 19 is integrally formed of insulating resin in such a manner that the bus bar holding parts 29 formed on the tip end sides of the multiple connecting parts 37 arranged at regular intervals along the longitudinal direction of the wire routing part 35 are arranged in a comb teeth manner. The bus bars 17 are respectively held by the bus bar holding parts 29 of the wire routing body 19.

Each bus bar holding part 29 includes a rectangular plate-shaped bottom wall 39 for supporting the longitudinal direction central part (the part near the ridgeline 25) of the bus bar 17, a bulkhead 41 erected in continuation to a part (one side edge) of the outer edge of the bottom wall 39, a bus bar locking portion 43 formed in the bulkhead 41, and a first projection 31 and a second projection 33 respectively erected on the two ends of the bottom wall 39 in a direction along the ridgeline 25 of the bus bar 17.

The bus bar locking portion 43 is a locking lance which is formed in the bulkhead 41 for locking one side edge of the bus bar 17 to the wire routing body 19 and includes, in its tip end, a pawl-like projection projecting slightly toward the bottom wall. The bus bar locking portion 43 is arranged and formed according to the position of the bottom wall 39, while the pawl-like projection is formed at a position separated from the bottom wall 39 by a distance equal to or more than the thickness of the bus bar 17 in the wall height direction. That is, in the bus bar locking portion 43, the height dimension of the pawl-like projection with respect to the bottom wall 39 is set to have a clearance allowing the pawl-like projection to float up a predetermined distance from the electric connection part 45 of the voltage detection terminal 11.

Figure 6A:
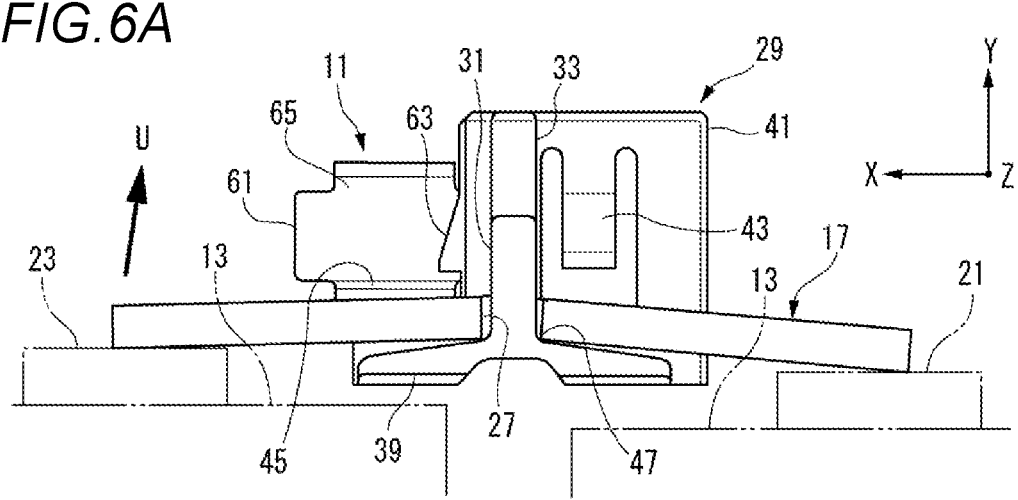
FIGS. 6A to 6C are views of the bus bar holding part of FIG. 5, when viewed from the T arrow direction.
Figure 6B:
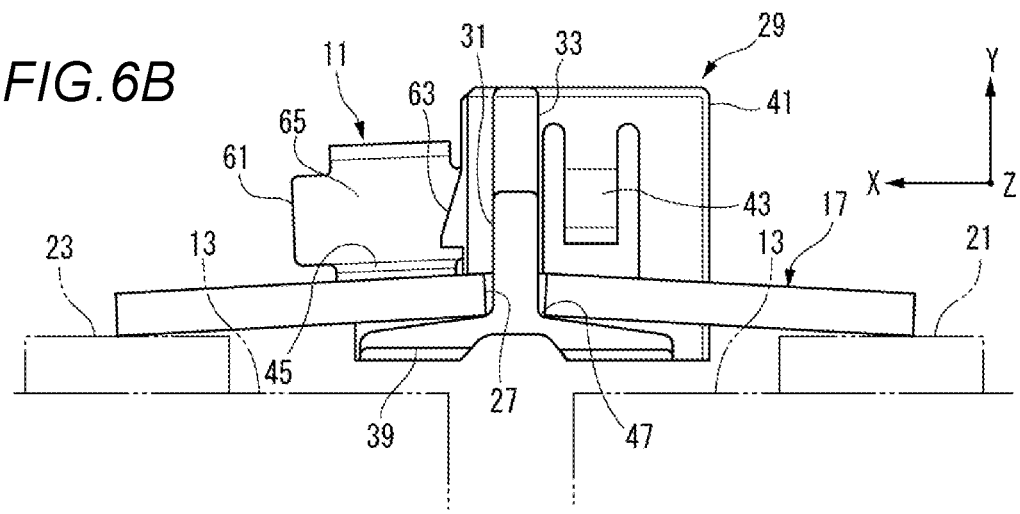
Figure 6C:
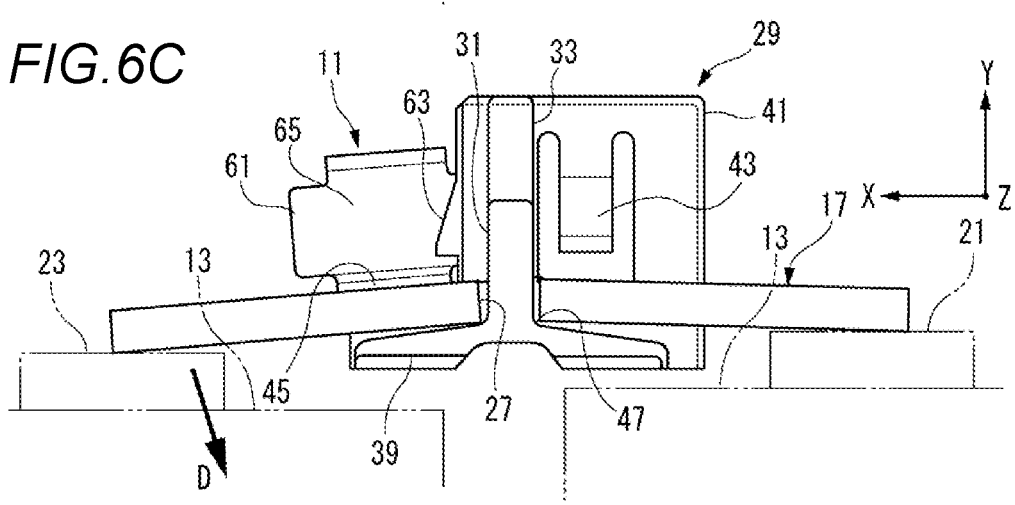
Figure 7:
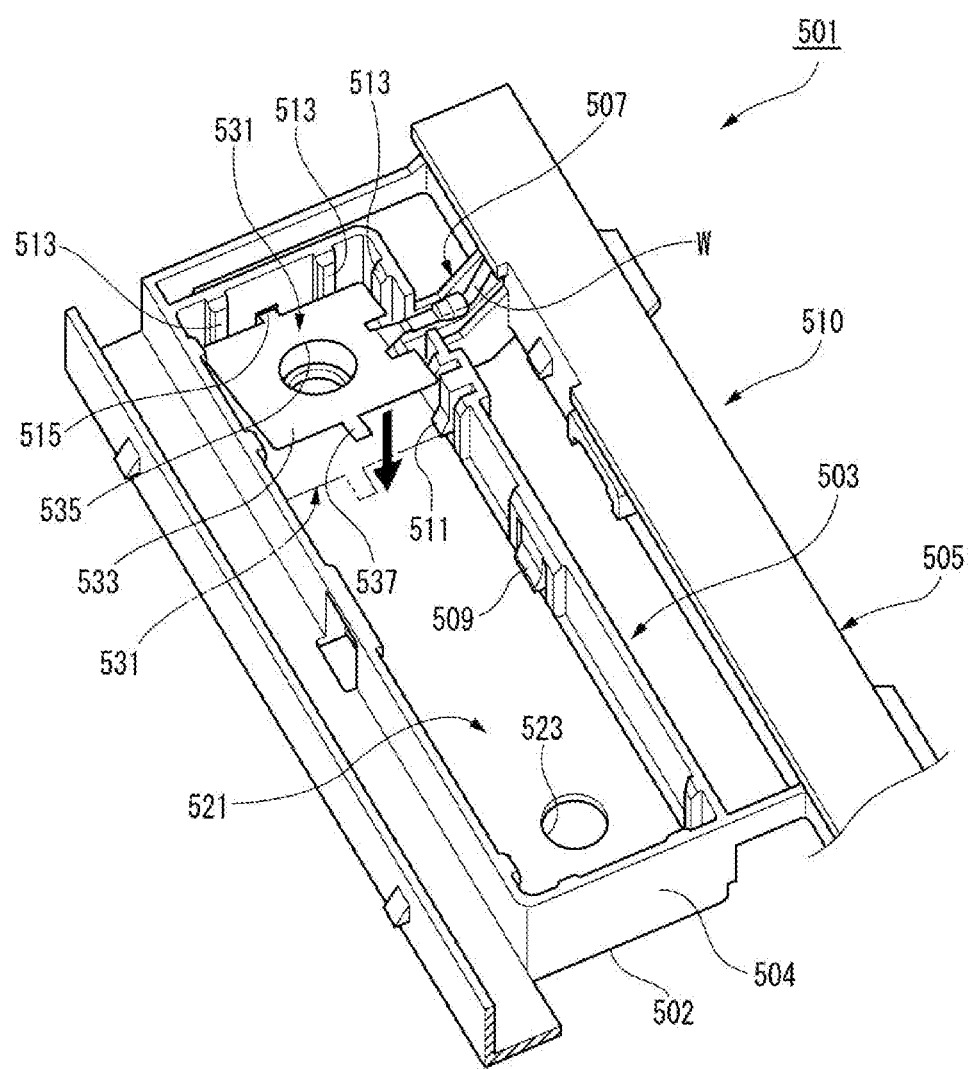
FIG. 7 is an exploded perspective view of main parts of a related bus bar module including a bus bar and a bus bar storage part.

Also, the bottom wall 39 is formed in a mountain shape whose two sides across the first projection 31 and second projection 33 are inclined downward in a direction along the X axis (see FIGS. 6A to 6C). When the adjacent unit batteries 13 are equal in height and the bus bar 17 is arranged horizontally, the top parts 47 of the bottom wall 39 with the first projection 31 and second projection 33 erected therefrom support the back side portions (valley folded portions) of the ridgeline 25. That is, the bottom wall 39 places the bus bar 17 swingably in the clockwise direction U and in the around-radius direction D in FIG. 6 at the top portions 47.

The above setting of the height dimension of the pawl-like projection of the bus bar locking portion 43 with respect to the bottom wall 39 can secure the engaging margin of one side edge of the bus bar 17 with the pawl-like projection of the bus bar locking portion 43 when the bus bar 17 is inclined. Thus, the bus bar 17 will not be disengaged from the bus bar holding part 29, while the displacement thereof is allowed.

According to this bus bar holding structure, simply by setting the height dimension of the pawl-like projection of the bus bar locking portion 43 with respect to the bottom wall 39, the bus bar 17 can be held in the wire routing body 19.

This eliminates the need for the wire routing body 19 to provide such peripheral wall as surrounds the bus bar 17, thereby enabling downsizing. Also, when the bus bar 17 is inserted until it is contacted with the bottom wall 39, since the bus bar locking portion 43 serving as insertion resistance is only one, when compared with the conventional structure, the insertion force of the bus bar 17 is reduced.

Further, the first projection 31 and second projection 33 erected from the bottom wall 39, as shown in FIG. 2, are respectively engaged with the paired engaging parts 27 formed in the opposed long side parts of the bus bar 17. The first projection 31 stands on the tip end edge side of the bottom wall 39, and the second projection 33 standing on the base end side of the bottom wall 39 is formed integrally with the bulkhead 41. Once the paired engaging parts 27 are engaged with the first and second projections 31 and 33, the rotation of the bus bar 17 about an axis (Y axis) existing in the center of the ridgeline 25 and perpendicular to the bottom wall 39 is regulated, thereby enabling positive positioning.

In the connecting part 37 connected to the upper end of the bulkhead 41, there is arranged the voltage detection terminal 11 which is connected to one end of the voltage detection wire W. The connecting part 37, using a pair of opposed side walls 49 and 51, defines a storage space for storing a wire connection part 53 of the voltage detection terminal 11.

Here, the bulkhead 41, as shown in FIG. 3, has a predetermined thickness in the Z axis direction, whereby it is formed in a parallelepiped. The bulkhead 41 includes a terminal storage recess 55 communicating with the storage space sandwiched between the side walls 49 and 51 of the connecting part 37. The terminal storage recess 55 provides a terminal insertion opening in the upper end face of the bulkhead 41, whereby it is open. Also, the side surface of the bulkhead 41 on the bus bar side provides an electric connection part lead-out opening 57 for leading out the electric connection part 45 of the voltage detection terminal 11 onto the bus bar, whereby it is open.

The bulkhead 41 includes, between the connecting part 37 and terminal storage recess 55, a groove 59 which is cut in the X axis direction. In this embodiment, the groove 59 is cut formed on the two sides of the bulkhead 41 in the X direction across the terminal storage recess 55. Terminal projection pieces 61 (which are described later) formed in the terminal detection terminal 11 are respectively inserted into the grooves 59 from the groove openings thereof. That is, the respective parts of the terminal detection terminal 11 connected to the voltage detection wire W are stored in the connecting part 37, grooves 59 and terminal storage recess 55, and the electric connection part 45 is placed onto the bus bar 17.

In the mutually opposed recess inner wall surfaces of the terminal storage recess 55, there are formed terminal holding parts 63 composed of locking lances which have pawl-like projections projecting slightly toward the mutually opposed recess inner wall surfaces. The terminal holding parts 63 are used to suppress the floating of the electric connection part 45 of the voltage detection terminal 11 stored in the connecting part 37, thereby enhancing storing workability. Here, each terminal holding part 63 is formed such that the pawl-like projection formed in the tip end thereof has such clearance with the electric connection part 45 as allows the electric connection part 45 to float. That is, the bus bar holding part 29 includes the terminal holding part 63 which regulates the movement of the electric connection part 45 in the anti-insertion direction with respect to the groove 59 at a position separated from the electric connection part 45.

The voltage detection terminal 11 of this embodiment, as shown in FIG. 2, has a rising wall 65 and has a crank-shaped section. The rising wall 65 is contacted with a recess deep side wall surface 67 (see FIG. 5) sandwiched between a pair of recess inner wall surfaces of the terminal storage recess 55. Contact of the rising wall 65 with the recess deep side wall surface 67 regulates the movement of the voltage detection terminal 11 in the wire pulling direction (the direction along the Z axis and away from the bus bar 17).

The voltage detection terminal 11 includes a wire connection part 53, an electric connection part 45 and a temporary fixing part 69.

To the wire connection part 53, there is connected the voltage detection wire W. The wire connection part 53 includes a conductor crimping portion 71 for crimping thereto a core exposed by peeling off the insulating coating in the end of the voltage detection wire W, and a coating crimping portion 73 for crimping thereto the end of the electric wire from above the insulating coating.

The electric connection part 45 is formed in a rectangular flat plate-like shape and is welded to the upper surface of the bus bar 17 by laser welding or the like.

The temporary fixing part 69 is formed between the electric connection part 45 and wire connection part 53, and includes a pair of terminal projection pieces 61. The terminal projection pieces 61 are respectively inserted into the grooves 59 of the bus bar holding part 29, while the movement thereof in a direction along the axis (a direction along the Z axis) in the end of the voltage detection wire W connected to the wire connection part 53 is regulated. In this embodiment, the terminal projection pieces 61 are provided on the side edges of the rising wall 65 to project in the X axis direction.

Thus, the temporary fixing part 69 is positioned in the Z axis direction with respect to the bus bar holding part 29 by the terminal projection 61 and rising wall 65, and the voltage detection terminal 11 is set in a temporarily fixed state in which it is prevented against removal by the terminal holding part 63.

Figure 4:
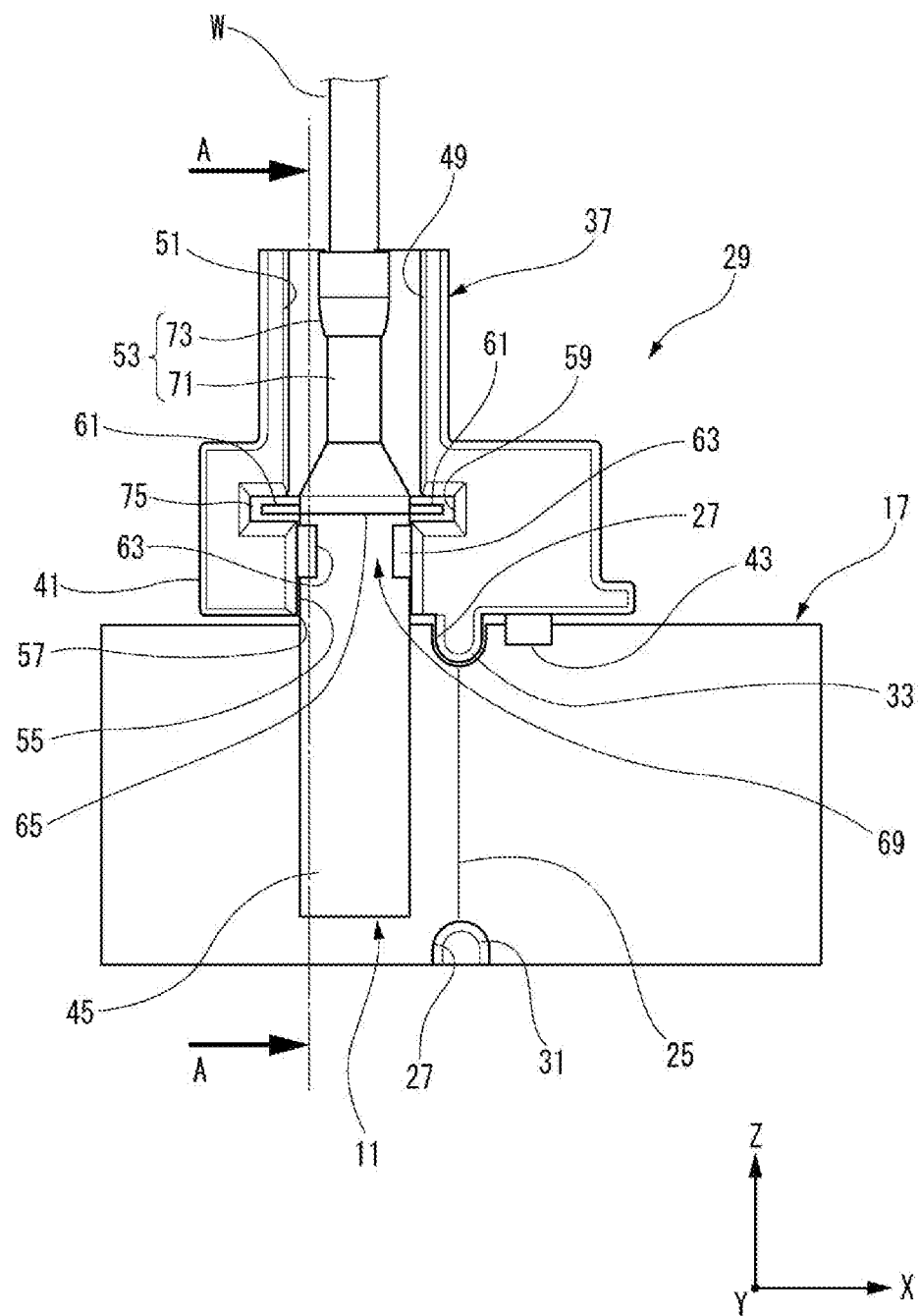
FIG. 4 is a plan view of FIG. 3.

The groove 59 of the temporary fixing part 69, as shown in FIG. 4, has a slight clearance with the protruded tip end of the terminal projection 61. As shown in FIG. 5, the terminal storage recess 55 of the temporary fixing part 69 has a clearance between the recess bottom wall 77 and electric connection part 45. The recess deep side wall surface 67 of the temporary fixing part 69 has a clearance 81 between its upper end and the voltage detection terminal 11. The connecting part 37 has a clearance 85 between the connecting part bottom wall 83 and wire connection part 53.

Therefore, in the voltage detection terminal 11, as shown in FIG. 5, in a state where the electric connection part 45 is in contact with the bus bar 17, only the rising wall 65 is contacted with the recess deep side wall surface 67. Thus, the voltage detection terminal 11 is fixed temporarily to the bus bar holding part 29 in a state where the movement of the temporary fixing part 69 in a direction along the axis in the end of the voltage detection wire W connected to the wire connection part 53 is regulated, and the displacement thereof in directions (X and Y directions) perpendicular to the axis (Z axis) and the rotations thereof around the axis (Z axis) (oscillations in the arrow U direction and arrow D direction in FIGS. 6A to 6C) are allowed.

The wire routing part 35 is formed in a gutter shape having a substantially U-like section which includes a rectangular plate-shaped wiring part bottom wall 87, and a pair of routing part side walls 89, 91 respectively erected vertically from the two edges of the routing part bottom wall 87 opposed to each other in the width direction of the routing part bottom wall 87.

The wire routing part 35 is disposed on the side of one-side edges of the bus bar holding parts 29 extending along the arrangement direction thereof and is connected to the bus bar holding parts 29 through the connecting parts 37. Thus, the wire routing part 35 provides a routing space in which the voltage detection wires W derived from the respective connecting parts 37 are routed in the superimposed direction of the unit batteries 13.

Here, in the wire routing part 35, wire hold parts may also be formed in the upper end edges of the routing part side walls 89, 91. Also, a rectangular cover part may be placed on the wire routing part 35 so as to close the upper opening thereof. The cover part is placed in such a manner that a part of one edge of the two edges (long side parts) thereof is rotatably connected through a hinge to one routing part side wall 89 of the wire routing part 35.

The voltage detection wire W serving as an electric wire to be routed in the routing space of the wire routing part 35 is a coated electric wire configured such that a core wire composed of a conductor is coated with an insulating coat. One end of the voltage detection wire W is crimped to the wire connection part 53 of the voltage detection terminal 11. The other end of the voltage detection wire W is connected to a voltage detection circuit (not shown).

Here, the electric wire of the invention is not limited to the coated wire but it is possible to use various electric wires such as a wire in which a unit wire composed of a conductor is coated with an insulating coat, or a flat cable.

Next, description is given of the operation of the above configuration.

In the holding structure of the voltage detection terminal 11 according to this embodiment, since the temporary fixing part 69 of the voltage detection terminal 11 is temporarily fixed to the bus bar holding part 29, a fixing part for temporarily fixing the voltage detection terminal 11 need not be formed in the peripheral wall surrounding the bus bar 17. Thus, the peripheral wall of the wire routing body 19 can be omitted, thereby enabling downsizing of the wire routing body 19.

Also, in the voltage detection terminal 11, since it is not necessary to temporarily fix the side edge of the electric connection part 45 to the peripheral wall, the electric connection part 45 can be downsized to the minimum size necessary for electric connection with the bus bar 17.

Further, the temporary fixing part 69 of the voltage detection terminal 11 is configured such that, while the movement thereof in a direction along the axis (in the arrow T direction in FIG. 5) in the end of the voltage detection wire W is regulated, the displacement thereof in a direction perpendicular to the axis and the rotation thereof around the axis are allowed. While being positively positioned with respect to the bus bar 17 in a direction where the electric connection part 45 extends along the axis, the temporary fixing part 69 can follow the displacement of the bus bar 17 in a direction perpendicular to the axis and the rotation of the bus bar 17 around the axis (in the arrow U direction and in the arrow D direction in FIGS. 6A to 6C). Thus, the voltage detection terminal 11 can absorb the displacement of the bus bar 17 and thus can always maintain the electric connection part 45 in a good contact state with respect to the bus bar 17.

Accordingly, for example, in a welding operation to weld the bus bar 17 held by the bus bar holding part 29 of the wire routing body 19 to the plus terminal 21 and minus terminal 23, when performing simultaneously therewith a welding operation to weld the electric connection part 45 of the voltage detection terminal 11 to the bus bars 17, the electric connection part 45 can maintain a good contact state with respect to the bus bars 17 even when the bus bars 17 are inclined due to the height difference between adjacent unit batteries 13. Thus, the voltage detection terminal 11 can be welded to the bus bars 17 with high quality.

Also, in a state where the electric connection part 45 of the voltage detection terminal 11 is previously welded to the bus bars 17 held by the bus bar holding parts 29 of the wire routing body 19, when welding the bus bars 17 to the plus terminal 21 and minus terminal 23, even while the bus bars 17 are inclined due to the height difference between adjacent unit batteries 13, the voltage detection terminal 11 with the temporary fixing part 69 fixed temporarily to the bus bar holding part 29 can be inclined following the inclination of the bus bar 17. Thus, in the welding operation between the bus bar 17 and the plus terminal 21 and minus terminal 23, no load is applied to the welding portion of the electric connection part 45 and bus bar 17. Accordingly, the electric connection part 45 of the voltage detection terminal 11 can maintain a good contact state with respect to the bus bar 17.

Also, in the holding structure of the voltage detection terminal 11, by inserting the terminal projection 61 of the temporary fixing part 69 of the voltage detection terminal 11 into the groove 59 of the bus bar holding part 29, the temporary fixing position of the voltage detection terminal 11 in a direction along the axis in the end of the voltage detection wire W can be positioned accurately. In the voltage detection terminal 11, since the insertion direction of the terminal projection 61 into the groove 59 and the engaging direction thereof with the terminal holding portion 63 of the bus bar holding part 29 are the same direction, assembling workability is enhanced, thereby enabling reduction of manufacturing cost. The terminal holding portion 63 regulates the movement of the electric connection part 45 in an anti-insertion direction with respect to the groove 59 at a position separated from the electric connection part 45, while the terminal holding portion 63 will not interfere with the temporary fixing part 69 which follows the displacement of the bus bar 17 in a direction perpendicular to the axis and the rotation of the bus bar 17 around the axis.

Further, in the voltage detection terminal holding structure 11, the rising wall 65 and terminal projection 61 provided in the temporary fixing part 69 of the voltage detection terminal 11 provide surfaces perpendicular to the axis in the end of the voltage detection wire W and are contacted with the bus bar holding part 29. Thus, the temporary fixing part 69 of the voltage detection terminal 11 is supported by the bus bar holding part 29 with a large area, and a large strength in the pulling direction of the voltage detection wire W can be secured. Also, in the movement of the voltage detection wire W in the opposite direction to the pulling direction as well, the terminal projection 61 is surface contacted with the bus bar holding part 29. Thus, when compared with a structure in which the end edge of the terminal projection 61 is contacted with the bus bar holding part 29, the movement regulation strength in the same direction can be increased.

The invention is not limited to the above embodiment; but, combinations of the respective configurations of the embodiment, and changes and applications by a person skilled in the art based on the description of the specification and well-known technology are also planned by the invention and are included in the scope of the claims seeking protection.

For example, in the above configuration example, the voltage detection terminal is formed in a shape having a crank-shaped section. However, it may also be formed in a rectangular plate-like shape. In this case, the terminal projection can be provided in such a manner that it is projected from both sides of the electric connection part. Also, in the above configuration example, a pair of terminal projections are provided but, but they may also be replaced by a single terminal projection.

Therefore, according to the holding structure of the voltage detection terminal 11 of the invention, while the positioning etc. of the voltage detection terminal 11 with respect to the bus bar holding part 29 can be attained positively, useless parts can be reduced and the wire routing body 19 can be reduced in size and weight, thereby enabling reduction of manufacturing cost.

Further, according to the holding structure of the voltage detection terminal 11 of the invention, the voltage detection terminal 11 can absorb the displacement of the bus bar 17 and can always maintain the electric connection part 45 in a good contact state with respect to the bus bar 17.

Here, the characteristics of the above-described embodiment of the voltage detection terminal holding structure of the invention are summarized in brief and are described below.

[1] A voltage detection terminal holding structure comprising:
a bus bar holding part (29); and
the voltage detection terminal (11) held in the bus bar holding part,
wherein the voltage detection terminal includes an electric connection part (45) configured to be connected to a bus bar, a wire connection part (53) configured to be connected to an electric wire (voltage detection wire W), and a temporary fixing part (69),
wherein the temporary fixing part is formed between the electric connection part and the wire connection part, and
wherein the temporary fixing part is temporarily fixed to the bus bar holding part in a state that a movement in an axis direction in an end of the electric wire connected to the wire connection part is regulated and in a state that a displacement in a perpendicular direction to the axis direction and a rotation around the axis direction are allowed, and
wherein the bus bar holding part includes a bottom wall in which a top portion formed in a mountain shape supports a longitudinal direction central part of the bus bar which is mounted and is a rectangular plate shape, and which is swingable the longitudinal direction central part of the bus bar around the axis direction.

[2] The voltage detection terminal holding structure according to the above-described [1],
wherein the temporary fixing part (69) includes a terminal projection piece (61) configured to be inserted into a groove (59) of the bus bar holding part (29) so as to regulate the movement in the axis direction, and
wherein the bus bar holding part includes a terminal holding part (63) regulating a movement of the electric connection part in an anti-insertion direction with respect to the groove at a position separated from the electric connection part (45).

[3] A voltage detection terminal holding structure comprising:
a bus bar holding part (29); and
the voltage detection terminal (11) held in the bus bar holding part,
wherein the voltage detection terminal includes an electric connection part (45) configured to be connected to a bus bar, a wire connection part (53) configured to be connected to an electric wire (voltage detection wire W), and a temporary fixing part (69),
wherein the temporary fixing part is formed between the electric connection part and the wire connection part, and
wherein the temporary fixing part is temporarily fixed to the bus bar holding part in a state that a movement in an axis direction in an end of the electric wire connected to the wire connection part is regulated and in a state that a displacement in a perpendicular direction to the axis direction and a rotation around the axis direction are allowed,
wherein the temporary fixing part (69) includes a terminal projection piece (61) configured to be inserted into a groove (59) of the bus bar holding part (29) so as to regulate the movement in the axis direction,
wherein the bus bar holding part includes a terminal holding part (63) regulating a movement of the electric connection part in an anti-insertion direction with respect to the groove at a position separated from the electric connection part (45),
wherein the temporary fixing part (69) includes a rising wall (65) having a crank-shaped section, which abuts with the bus bar holding part (29) so as to regulate a movement of the voltage detection terminal in a pull direction of the electric wire (voltage detection wire W), and
wherein the terminal projection piece (61) projects from a side edge of the rising wall.

[4] The voltage detection terminal holding structure according to the above-described [1],
wherein the bus bar holding part (29) is a part of an insulating resin-made wire routing body (19) storing a plurality of bus bars (17) electrically connecting unit batteries of a battery assembly (15) with each other.

[5] The voltage detection terminal holding structure according to the above-described [1],
wherein the voltage detection terminal (11) measures voltage of an unit battery of a battery assembly (15).

Here, the invention is not limited to the above embodiment but can be properly modified, improved, and the like. Also, the materials, shapes, dimensions, quantity, arrangement locations and the like of the respective composing elements of the above embodiment are arbitrary but not limitative as long as they can attain the invention.

| [Description of Reference Numerals and Sign] | |
|---|---|
| 11: Voltage detection terminal | 13: Unit battery |
| 15: Battery assembly | 17: Bus bar |
| 19: Wire routing body | 29: Bus bar holding part |
| 45: Electric connection part | 53: Wire connection part |
| 59: Groove | 61: Terminal projection piece |
| 63: Terminal holding portion | 65: Rising wall |
| 69: Temporary fixing part | |
| W: Voltage detection wire (electric wire) | |

What is claimed is:

1. A voltage detection terminal holding structure comprising:
a bus bar holding part; and
the voltage detection terminal held in the bus bar holding part,
wherein the voltage detection terminal includes an electric connection part configured to be connected to a bus bar, a wire connection part configured to be connected to an electric wire, and a temporary fixing part,
wherein the temporary fixing part is formed between the electric connection part and the wire connection part,
wherein the temporary fixing part is temporarily fixed to the bus bar holding part in a state that a movement in an axis direction in an end of the electric wire connected to the wire connection part is regulated and in a state that a displacement in a perpendicular direction to the axis direction and a rotation around the axis direction are allowed, and wherein the bus bar holding part includes a bottom wall in which a top portion formed in a mountain shape supports a longitudinal direction central part of the bus bar which is mounted and is a rectangular plate shape, and which is swingable the longitudinal direction central part of the bus bar around the axis direction.

2. The voltage detection terminal holding structure according to claim 1, wherein the temporary fixing part includes a terminal projection piece configured to be inserted into a groove of the bus bar holding part so as to regulate the movement in the axis direction, and wherein the bus bar holding part includes a terminal holding part regulating a movement of the electric connection part in an anti-insertion direction with respect to the groove at a position separated from the electric connection part.

3. A voltage detection terminal holding structure comprising:

a bus bar holding part; and the voltage detection terminal held in the bus bar holding part, wherein the voltage detection terminal includes an electric connection part configured to be connected to a bus bar, a wire connection part configured to be connected to an electric wire, and a temporary fixing part, wherein the temporary fixing part is formed between the electric connection part and the wire connection part, wherein the temporary fixing part is temporarily fixed to the bus bar holding part in a state that a movement in an axis direction in an end of the electric wire connected to the wire connection part is regulated and in a state that a displacement in a perpendicular direction to the axis direction and a rotation around the axis direction are allowed, wherein the temporary fixing part includes a terminal projection piece configured to be inserted into a groove of the bus bar holding part so as to regulate the movement in the axis direction, wherein the bus bar holding part includes a terminal holding part regulating a movement of the electric connection part in an anti-insertion direction with respect to the groove at a position separated from the electric connection part, wherein the temporary fixing part includes a rising wall having a crank-shaped section, which abuts with the bus bar holding part so as to regulate a movement of the voltage detection terminal in a pull direction of the electric wire, and wherein the terminal projection piece projects from a side edge of the rising wall.

4. The voltage detection terminal holding structure according to claim 1, wherein the bus bar holding part is a part of an insulating resin-made wire routing body storing a plurality of bus bars electrically connecting unit batteries of a battery assembly with each other.

5. The voltage detection terminal holding structure according to claim 1, wherein the voltage detection terminal measures voltage of an unit battery of a battery assembly.

* * * * *